United States Patent Office 3,271,403
Patented Sept. 6, 1966

3,271,403
2,4-DIALKOXY-5,6-HYDROCARBYLENE-3-NITROPYRIDINES
André Grüssner and Otto Schnider, Basel, Switzerland, assignors to Hoffmann-La Roche Inc., Nutley, N.J., a corporation of New Jersey
No Drawing. Filed Sept. 3, 1963, Ser. No. 306,314
Claims priority, application Switzerland, Sept. 12, 1962, 10,829/62
12 Claims. (Cl. 260—289)

This invention relates, in general, to novel pyridine compounds and to a process for the production thereof. More particularly, the invention relates to pyridine derivatives having the general formula

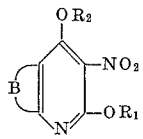

I in which $R_1$ is a lower alkyl group; $R_2$ is a lower alkyl group; and B is a $—(CR_3=CR_4)_2$-group or a $—(CR_3H)_x$-group, in which groups $R_3$ is hydrogen or a lower alkyl group, $R_4$ is hydrogen or a lower alkyl group and $x$ is the integer 4 or 5.

The lower alkyl groups which, in Formula I, are represented by the symbols $R_1$ and $R_2$ are, preferably, alkyl groups having carbon chain lengths of from 1 to 3 carbon atoms. Thus, for example, the symbols $R_1$ and $R_2$ represent, preferably, methyl, ethyl, propyl, and isopropyl groups. The lower alkyl groups which, in Formula I, are represented by the symbols $R_3$ and $R_4$ are alkyl groups having carbon chain lengths of from 1 to 5 carbon atoms. Thus, for example, the symbols $R_3$ and $R_4$ represent, preferably, methyl, ethyl, propyl, butyl, isobutyl, pentyl, etc., groups.

The substituents which are represented in Formula I by the symbols $R_1$ and $R_2$ may be alike or different. In the preferred compounds of the invention the $R_1$ and $R_2$ substituents are the same said substituents preferably being methyl or ethyl groups.

Furthermore, with respect to the $R_3$ and $R_4$ substituents, these substituents are, preferably, methyl or ethyl groups. These substituents may be present in any one, or in several, of the possible positions.

The following are examples of certain of the compounds produced in the preferred embodiment of this invention: 2,4 - dimethoxy - 3-nitro-5,6,7,8-tetrahydroquinoline; 2,4-diethoxy - 3 - nitro - 5,6,7,8-tetrahydroquinoline; 2,4-dimethoxy-3-nitroquinoline; and 2,4-dimethoxy-3-nitro-5,6-cyclopentamethylene pyridine. In general, these compounds are, because of their fragrance and fixative properties, useful as odorants and as fixatives in the preparation of perfumes and other scented preparations.

The compounds of this invention can be prepared quite readily. In general, the method of preparation involves the reaction of a 2,4-dihalogeno-3-nitropyridine compound having the formula:

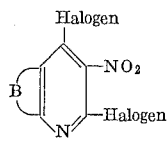

II in which the symbol B has the same meaning as in Formula I and in which the word Halogen represents a halogen atom, preferably, a chlorine or bromine atom with an alkali alcoholate of a lower alcohol. In such reaction there is employed, preferably, an alkali alcoholate of an alcohol having a carbon chain length of from 1 to 3 carbon atoms, such as methanol and ethanol.

The reaction of the halogen substituted compound of Formula II with the alkali alcoholate brings about the replacement of the halogen substituents of the first named compound by alkoxy groups. Such result can be accomplished, conveniently, by reacting the halogen compound with an alcoholic solution of the alkali alcoholate. The latter solution can be obtained by dissolving an alkali metal, an alkali hydroxide or an alkali metal alcoholate in an alcohol.

In the preferred practice of this invention, there is produced compounds of Formula I in which the $R_1$ and $R_2$ substituents are the same. However, by means of partial alkoxylation, one can obtain compounds in which $R_1$ and $R_2$ are different from each other, as, for example, where one of the substituents is a methyl group and where the other substituent is an ethyl group.

As indicated heretofore, the novel compounds of this invention are useful in the preparation of perfumes and other scented compositions. They possess a pronounced musk-like odor and exhibit good fixative properties and, hence, they can be used in the perfume art as odorants and fixative agents. It will be understood, however, that the various compounds will manifest certain differences in degree or intensity of fragrance. For example, it has been observed that 2,4 - dimethoxy-3-nitro-5,6,7,8-tetrahydroquinoline is most suitable for use where an intense musk-like odor is desired. In contrast, 2,4-diethoxy-3-nitro-5,6, 7,8 - tetrahydroquinoline, 2,4-dimethoxy-3-nitroquinoline and 2,4-dimethoxy-3-nitro-5,6-cyclopentamethylene pyridine are characterized by an odor which is fainter and less intense than that of 2,4-dimethoxy-3-nitro-5,6,7,8-tetrahydroquinoline. However, the odor of 2,4-dimethoxy-3-nitro-5,6-cyclopentamethylene pyridine is considered to be the closest to the natural musk.

The dihalogen starting compounds of Formula II, in which the symbol B represents a $—(CR_3=CR_4)_2$-group, are known compounds. However, those starting materials of Formula II in which the symbol B represents a pentamethylene or a substituted pentamethylene group are novel. Such compounds can be obtained from the corresponding dihydroxy compounds by replacing the hydroxyl groups of such compounds with halogen atoms. For example, 2,4-dichloro-3-nitro-5,6-cyclopentamethylene pyridine can be prepared by reacting 2,4-dihydroxy-3-nitro-5,6-cyclopentamethylene pyridine with phosphorus oxychloride.

Furthermore, the starting compounds of Formula II in which the symbol B represents a $—(CR_3H)_4$-group, that is, the 2,4-dihalo-3-nitro-5,6,7,8-tetrahydroquinoline compounds, are new. These compounds can be obtained from the corresponding dihydroxy compounds by replacing the hydroxyl groups thereof with halogen atoms. Thus, for example, 2-4,-dichloro-3-nitro-5,6,7,8-tetrahydroquinoline can be prepared by the reaction of 2,4-dihydroxy-3-nitro-5,6,7,8-tetrahydroquinoline with phosphorus oxychloride. The 2,4-dihydroxy-3-nitro-5,6,7,8-tetrahydroquinoline which is used in such preparation can be obtained by the nitration of 2,4-dihydroxy-5,6,7,8-tetrahydroquinoline.

For a fuller understanding of the nature and objects of this invention, reference may be had to the following examples which are given merely as further illustration of the invention and are not to be construed in a limiting sense.

*Example 1*

To a solution of 5.6 grams of potassium hydroxide in 40 ml. of methanol there was added 4.94 grams of 2,4-dichloro-3-nitro-5,6,7,8-tetrahydroquinoline. The mixture was heated at its reflux temperature for two hours while nitrogen was passed through it. After cooling, the reaction mixture was made slightly congo-acid with concentrated hydrochloric acid, filtered with suction to remove the potassium chloride present and, thereafter, concentrated. By this procedure there was obtained 2,4-dimethoxy-3-nitro-5,6,7,8-tetrahydroquinoline. That compound was dissolved in ether and washed with water. Subsequently, ether was evaporated off and the product was allowed to crystallize from dilute methanol. The crystalline product which was thus obtained exhibited a faint yellow coloration and had a melting point of 36° to 38° C. The product was obtained in a yield of 70% of theory.

*Example 2*

By the procedure described in Example 1, using ethanol instead of methanol, there was obtained 2,4-diethoxy-3-nitro-5,6,7,8-tetrahydroquinoline. That product precipitated in the form of light yellow crystals having a melting point of 51° to 53° C.

The 2,4-dichloro-3-nitro-5,6,7,8-tetrahydroquinoline which was used as the starting material in this example as well as in Example 1 was prepared from the corresponding hydroxy compound (that is, 2,4-dihydroxy-3-nitro-5,6,7,8-tetrahydroquinoline, having a melting point of 224° C. with decomposition) by heating same with phosphorus oxychloride at a temperature of 135° C. The compound melted at 70° to 71° C. after crystallization from petroleum ether.

The dihydroxy compound which was used in the production of the 2,4-dichloro-3-nitro-5,6,7,8-tetrahydroquinoline was prepared in the following manner:

40 grams of 2,4-dihydroxy-5,6,7,8-tetrahydroquinoline were stirred for three hours with 200 ml. of concentrated nitric acid. Upon mixing, the temperature of the reaction mixture rose to about 35° C. When the temperature of the reaction mixture commenced to fall, the reaction mixture was placed in ice-water for two hours and treated with water until turbidity sets in. Thereafter, it was filtered with suction and crystallized from aqueous acetic acid. There was obtained 27 grams of the 2,4-dihydroxy-3-nitro-5,6,7,8-tetrahydroquinoline which melted at 244° C., with decomposition.

*Example 3*

5.2 grams of 2,4-dichloro-3-nitro-5,6-cyclopentamethylene pyridine were heated at reflux for 1½ hours in 40 ml. of a 15% solution of postassium hydroxide in methanol. After cooling, the reaction mixture was acidified with alcoholic hydrochloric acid, filtered with suction to remove the postassium chloride present and concentrated. The residue was taken up in ether and washed with water. The 2,4-dimethoxy-3-nitro-5,6-cyclopenthamethylene pyridine, which remains behind after evaporation of the ether, was crystallized from 90% methanol. The product was obtained in a yield of 75% of theory in the form of light yellow crystals of melting point 53° to 55° C.

The 2,4-dichloro-3-nitro-5,6-cyclopentamethylene pyridine, which was used as the starting material in this example was prepared by heating the corresponding dihydroxy compound (that is, 2,4-dihydroxy-3-nitro-5,6-cyclopentamethylene pyridine of melting point 238° to 239° C.) at 60° C. for two hours in phosphorus oxychloride. The compound was obtained in the form of yellowish crystals having a melting point of 68° to 70° C.

*Example 4*

20 grams of 2,4-dichloro-3-nitroquinoline were introduced portionwise at 5° C while stirring into a solution prepared from 7.6 grams of sodium and 200 ml. of absolute methanol. After stirring for 48 hours at 20° to 25° C., the solution was adjusted to pH 5.8 with glacial acetic while cooling with ice and, subsequently, it was concentrated in a vacuum at 40° C. bath temperature. The residue was dissolved in low-boiling petroleum ether, the solution washed with water, dried with sodium sulphate and evaporated. Upon recrystallization from low-boiling petroleum ether, there was obtained 16.0 grams (83% of theory) of 2,4-dimethoxy-3-nitroquinoline having a melting point of 69° to 70° C.

*Example 5*

By the procedure described in Example 4, using sodium ethylate in absolute alcohol in place of the methanolic solution of sodium, there was obtained 2,4-diethoxy-3-nitroquinoline, in the form of yellow crystals, having a melting point of 56° to 57° C.

*Example 6*

5.22 g. of 2,4-dichloro-3-nitro-6-methyl-5,6,7,8-tetrahydroquinoline were heated at reflux for 2 hours in a solution of 5.6 g. of potassium hydroxide in 100 ml. of methanol. After cooling, the reaction mixture was neutralized with acetic acid, filtered with suction to remove the precipitated salts, whereupon the methanol was evaporated under reduced pressure. The residue was treated with 100 ml. of water and 200 ml. of petroleum ether. The resulting petroleum ether solution was dried and concentrated, and the residue crystallized from methanol. 2,4-dimethoxy-3-nitro-6-methyl-5,6,7,8-tetrahydroquinoline was obtained in a yield of 75% in the form of yellow crystals of melting point 58–59° C.

The 2,4-dichloro-3-nitro-6-methyl-5,6,7,8-tetrahydroquinoline used as the starting material in this example, which substance has a melting point of 81–83° C., was obtained in a manner analogous to that of Example 2, as follows: 2,4-dihydroxy-6-methyl-5,6,7,8-tetrahydroquinoline (M.P.>340° C.) was nitrated to form 2,4-dihydroxy-3-nitro-6-methyl-5,6,7,8-tetrahydroquinoline (M.P. 235° C.) which substance was converted to the desired 2,4-dichloro-3-nitro-6-methyl-5,6,7,8-tetrahydroquinoline by reaction with phosphorus oxychloride.

The above 2,4-dihydroxy-6-methyl-5,6,7,8-tetrahydroquinoline can be obtained from 4-methyl-cyclohexanone in the following manner: 4-methyl-cyclohexanone→2-oxo-5-methyl-hexahydrobenzoic acid ethylester (boiling point 118–120° C. at 15 mm. Hg)→2-amino-5-methyl-cyclohexen-(1)-yl-carboxylic acid ethylester (M.P. 47–49° C.)→2,4-dihydroxy-6-methyl-5,6,7,8-tetrahydroquinoline-3-carboxylic acid ethylester (M.P. 219–222° C.)→2,4-dihydroxy-6-methyl-5,6,7,8-tetrahydroquinoline.

*Example 7*

In analogy to Example 6, 2,4-dichloro-3-nitro-8-methyl-5,6,7,8-tetrahydroquinoline (M.P. 56–58° C.) was converted to 2,4-dimethoxy-3-nitro-8-methyl-5,6,7,8-tetrahydroquinoline which was obtained in a yield of 75% in the form of a light yellow oil of boiling point 95° C./0.003 mm. Hg.

The 2,4-dichloro-3-nitro-8-methyl-5,6,7,8-tetrahydroquinoline used as the starting material in this example, can be obtained in the following manner: 2-methyl-hexanone→2-oxo-3-methyl-hexahydrobenzoic acid ethylester (boiling point 117–119° C./18 mm. Hg)→2-amino-3-methyl-cyclohexen-(1)-yl-carboxylic acid ethylester (boiling point 146–148° C./15 mm. Hg)→2,4-dihydroxy-8-methyl-5,6,7,8-tetrahydroquinoline-3-carboxylic acid ethylester (M.P. 189–190° C.)→2,4-dihydroxy-8-methyl-5,6,7,8-tetrahydroquinoline (M.P.>320° C.)→dihydroxy-3-nitro-8-methyl-5,6,7,8-tetrahydroquinoline (M.P. 223–225° C.)→2,4-dichloro-3-nitro-8-methyl-5,6,7,8-tetrahydroquinoline.

We claim:
1. Compounds of the formula:

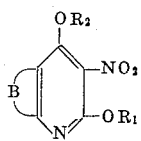

in which $R_1$ is a lower alkyl group selected from the group consisting of methyl and ethyl; $R_2$ is a lower alkyl group selected from the group consisting of methyl and ethyl; and B is a member selected from the group consisting of $-(CR_3=CR_4)_2-$ and $-(CR_3H)_x-$ wherein $R_3$ is a member selected from the group consisting of hydrogen, methyl and ethyl, $R_4$ is a member selected from the group consisting of hydrogen, methyl and ethyl and $x$ is an integer selected from the group consisting of 4 and 5.

2. 2,4-dimethoxy-3-nitro-5,6,7,8-tetrahydroquinoline.
3. 2,4-diethoxy-3-nitro-5,6,7,8-tetrahydroquinoline.
4. 2,4-dimethoxy-3-nitro-5,6-cyclopentamethylene pyridine.
5. 2,4-dimethoxy-3-nitroquinoline.
6. 2,4-diethoxy-3-nitroquinoline.
7. 2,4-dimethoxy-3-nitro-6-methyl-5,6,7,8 - tetrahydroquinoline.
8. 2,4-dimethoxy-3-nitro-8-methyl-5,6,7,8 - tetrahydroquinoline.
9. 2,4-dichloro-3-nitro-5,6 - cyclopentamethylene pyridine.
10. 2,4-dichloro-3-nitro-5,6,7,8-tetrahydroquinoline.
11. 2,4-dichloro-3-nitro-6-methyl - 5,6,7,8 - tetrahydroquinoline.
12. 2,4-dichloro-3-nitro-8-methyl - 5,6,7,8 - tetrahydroquinoline.

References Cited by the Examiner

Colonna: Chem. Abstract. vol. 34, column 3746(4) (1940).
Elderfield: Heterocyclic Compounds, vol. IV Reinhold, 1952, p. 268.
Fuson: "Organic Chemistry," Wiley, 1942, p. 252.
Illuminati, et al.: J. Am. Chem. Soc., vol. 80, pp. 1420–24 (1958).
Moncrief: "Chemistry of Perfumery Materials," United Trade Press, London, 1949, pp. 191, 192 and 196.

ALEX MAZEL, *Primary Examiner.*

HENRY R. JILES, NICHOLAS S. RIZZO, DONALD G. DAUS, *Assistant Examiners.*